United States Patent
Walker et al.

(10) Patent No.: US 10,788,947 B1
(45) Date of Patent: Sep. 29, 2020

(54) NAVIGATION BETWEEN INPUT ELEMENTS OF A GRAPHICAL USER INTERFACE

(71) Applicant: International Business Machines Corporation, Armonk, NY (US)

(72) Inventors: Samuel Stephen Walker, Greetland (GB); Zoe Gathercole, Southampton (GB); Joseph Alexander Cass, Stockton-on-Tees (GB); Alvaro Antonio Bejar, London (GB); Alexander John Naylor, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/503,798

(22) Filed: Jul. 5, 2019

(51) Int. Cl.
*G06F 3/0482* (2013.01)
*G06F 3/0481* (2013.01)

(52) U.S. Cl.
CPC ........ *G06F 3/04812* (2013.01); *G06F 3/0482* (2013.01); *G06F 2203/04801* (2013.01)

(58) Field of Classification Search
CPC .............. G06F 3/0482; G06F 3/04812; G06F 2203/04801
USPC ...................................... 715/856, 834, 701
See application file for complete search history.

(56) References Cited

U.S. PATENT DOCUMENTS

| | | | |
|---|---|---|---|
| 6,664,989 B1 * | 12/2003 | Snyder | G06F 3/038 715/856 |
| 2009/0249257 A1 | 10/2009 | Bove et al. | |
| 2009/0327963 A1 * | 12/2009 | Mouilleseaux | G06F 3/0482 715/834 |
| 2013/0125066 A1 | 5/2013 | Klein et al. | |
| 2014/0047333 A1 * | 2/2014 | Braun | G05B 19/00 715/701 |
| 2014/0365931 A1 | 12/2014 | Yoshimura | |
| 2015/0261408 A1 | 9/2015 | Ostergren et al. | |
| 2016/0299660 A1 | 10/2016 | Au et al. | |

OTHER PUBLICATIONS

"Use "snap to" feature of mouse attached to your PC/computer," TechblissOnline, printed: May 7, 2019, 7 pages. https://techblissonline.com/use-snap-to-feature-of-mouse-attached-to-your-pccomputer/.

(Continued)

*Primary Examiner* — Andrey Belousov
(74) *Attorney, Agent, or Firm* — Nathan M. Rau (57) ABSTRACT

Navigation between input elements of a graphical user interface (GUI) using a pointing device to control an interaction with the GUI. The method includes: activating a mode of operation between discrete input elements in the GUI; snapping the cursor to a first input element, wherein the movement of the cursor is then restricted to the first input element and input to the input element is receivable via user interaction with the pointing device; detecting a movement of the pointing device representing an intended movement from the first input element to another input element, including obtaining an angle of the movement; selecting a most likely intended input element as the target of the movement by evaluating positions of other input elements in a current user display of the GUI and comparing the angle of the movement with the positions of the other input elements.

19 Claims, 5 Drawing Sheets

(56) References Cited

OTHER PUBLICATIONS

"How to move the mouse cursor with the keyboard in Windows," Computer Hope, May 4, 2019, 7 pages. https://www.computerhope.com/issues/ch000542.htm.
"SmartNav," printed: May 7, 2019, 2 pages, https://www.naturalpoint.com/smartnav/.

* cited by examiner

NAVIGATION BETWEEN INPUT ELEMENTS OF A GRAPHICAL USER INTERFACE

BACKGROUND

The present disclosure relates to navigation between input elements of a graphical user interface (GUI), and more specifically, when using a pointing device to control a cursor displayed on the GUI.

While the development of capacitive touch screens has revolutionized the user experience on phones and tablets, the primary user experience on a computer has not changed with the cursor still being the primary navigation tool. The cursor is generally moved around a GUI by a pointing device controlled by the user, with interaction with input elements of the GUI carried out by input to the pointing device, such as right or left clicking. There are a few exceptions to the use of a cursor, such as keyboard navigation for accessibility purposes.

Navigating with a cursor in a GUI in which interaction is required with multiple input elements, such as a webpage or online form, increases navigation time by requiring the movement of the mouse over white space in order to get to an input element.

People with low dexterity often struggle to use a pointing device such as a trackpad or mouse precisely, causing them to struggle when completing precise tasks, such as navigating web pages where the interaction they need has a small input area. This can often result in the user miss-clicking and causing a degradation in their experience.

Users can choose to use keyboard navigation, most commonly performed by tabbing through each input area on the page, but this is often inefficient in completing tasks. For example, if the desired input area is further down the page, i.e. on the bottom right of a feature-heavy website. In addition to this, the order in which features are selected when tabbing through is not always top to bottom on the page, which can result in an unpredictable and frustrating user experience.

Additional keyboard navigation also exists in the form of keyboard shortcuts. Such shortcuts require a steep learning curve to fully use the keyboard to navigate a screen. For this reason, although in some instances it is the more efficient way to navigate, keyboard navigation is primarily used only by the people who have no other option due to dexterity.

SUMMARY

According to an aspect of the present disclosure there is provided a computer-implemented method for navigation between input elements of a graphical user interface (GUI) using a pointing device to control an interaction with the GUI, comprising: activating a mode of operation between discrete input elements in the GUI; snapping the cursor to a first input element, wherein the movement of the cursor is then restricted to the first input element and input to the input element is receivable via user interaction with the pointing device; detecting a movement of the pointing device representing an intended movement from the first input element to another input element, including obtaining an angle of the movement; selecting a most likely intended input element as the target of the movement by evaluating positions of other input elements in a current user display of the GUI and comparing the angle of the movement with the positions of the other input elements; snapping the cursor to a selected input element, wherein the movement of the cursor is then restricted to the selected input element and input to the selected input element is receivable via user interaction with the pointing device; and iterating the method to detect a further movement of the pointing device from the selected input element to select a next input element until the mode of operation is deactivated.

According to another aspect of the present disclosure there is provided a system for navigation between input elements of a graphical user interface (GUI) using a pointing device to control an interaction with the GUI, comprising: a processor and a memory configured to provide computer program instructions to the processor to execute the function of the components: an activating component for activating a mode of operation between discrete input elements in the GUI; a snapping component for snapping the cursor to an input element, wherein the movement of the cursor is then restricted to the first input element and input to the input element is receivable via user interaction with the pointing device; a movement detecting component for detecting a movement of the pointing device representing an intended movement from an input element to another input element, including a parameter obtaining component for obtaining an angle of the movement; and an input element selecting component for selecting a most likely intended input element as the target of the movement by evaluating positions of other input elements in a current user display of the GUI and comparing the angle of the movement with the positions of the other input elements.

According to a further aspect of the present disclosure there is provided a computer program product for navigation between input elements of a graphical user interface (GUI) using a pointing device to control an interaction with the GUI, the computer program product comprising a computer readable storage medium having program instructions embodied therewith, the program instructions executable by a processor to cause the processor to: activate a mode of operation between discrete input elements in the GUI; snap the cursor to a first input element, wherein the movement of the cursor is then restricted to the first input element and input to the input element is receivable via user interaction with the pointing device; detect a movement of the pointing device representing an intended movement from the first input element to another input element, including obtaining an angle of the movement; select a most likely intended input element as the target of the movement by evaluating positions of other input elements in a current user display of the GUI and comparing the angle and of the movement with the positions of the other input elements; snap the cursor to a selected input element, wherein the movement of the cursor is then restricted to the selected input element and input to the selected input element is receivable via user interaction with the pointing device; and iterate the method to detect a further movement of the pointing device from the selected input element to select a next input element until the mode of operation is deactivated.

BRIEF DESCRIPTION OF THE DRAWINGS

The subject matter regarded as the disclosure is particularly pointed out and distinctly claimed in the concluding portion of the specification. The disclosure, both as to organization and method of operation, together with objects, features, and advantages thereof, may best be understood by reference to the following detailed description when read with the accompanying drawings.

Embodiments of the present disclosure will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described for navigation between input elements of a graphical user interface (GUI) using a pointing device to control a cursor displayed on the GUI.

A cursor is an icon displayed on a screen which visually represents the current point which will be interacted with if the user makes an input, most commonly seen as an arrow head. A pointing device may be any device which is used to control a cursor on a screen, for example, a mouse, trackpad, gaze tracker, etc.

GUIs have input elements or widgets that are elements of interaction with the GUI. The input elements are defined as software components that a computer user uses to interact with an application. Each input element facilitates a specific type of interaction and appears as a visible part of an application's GUI when rendered by a rendering engine.

Input elements may be clickable areas for input, buttons, check boxes, drop down menus, sliders, input fields, etc. that may be provided in an application's GUI or on a web page. A user may wish to make inputs in a series of input elements and therefore may wish to move effortlessly between selected input elements.

The described method and system describe a mode of operation that may be activated for discrete navigation between input elements on a GUI display. The method may move the computer focus to a first input element, displaying to the user the specific input element, for example, by removing the cursor and highlighting the input element.

The mode of operation enables the user to interact with the input element and then make a movement with the pointing device that represents an intended movement from the current input element to a next input element. The movement may be detected and the intended next input element interpreted from the movement.

The mode of operation then snaps to the next input element removing the need for the user to accurately point with the cursor to the next input element. This allows users to move their focus on a screen quickly from one input element to another with minimal input. The user navigates from one input element to the next by using the pointing device, eliminating the need to move the cursor over white space.

The method also prevents a user from being able to click on white space by only allowing a user to interact with input elements. This reduces the danger of missing or accidentally clicking the wrong input element. The method may remove the cursor completely when in use, and the user moves discretely from one input element to another. This increases the speed of interaction with the input elements as there is no wasted time while a cursor is not over an input element.

The described discrete navigation mode between input elements, may take into account the distance between the focus of the user at the start, and other input elements in the display, and allows a user to be able to move over large distances quickly on the display, even when there are other input elements between their current focus and their intended destination.

Figure 1:
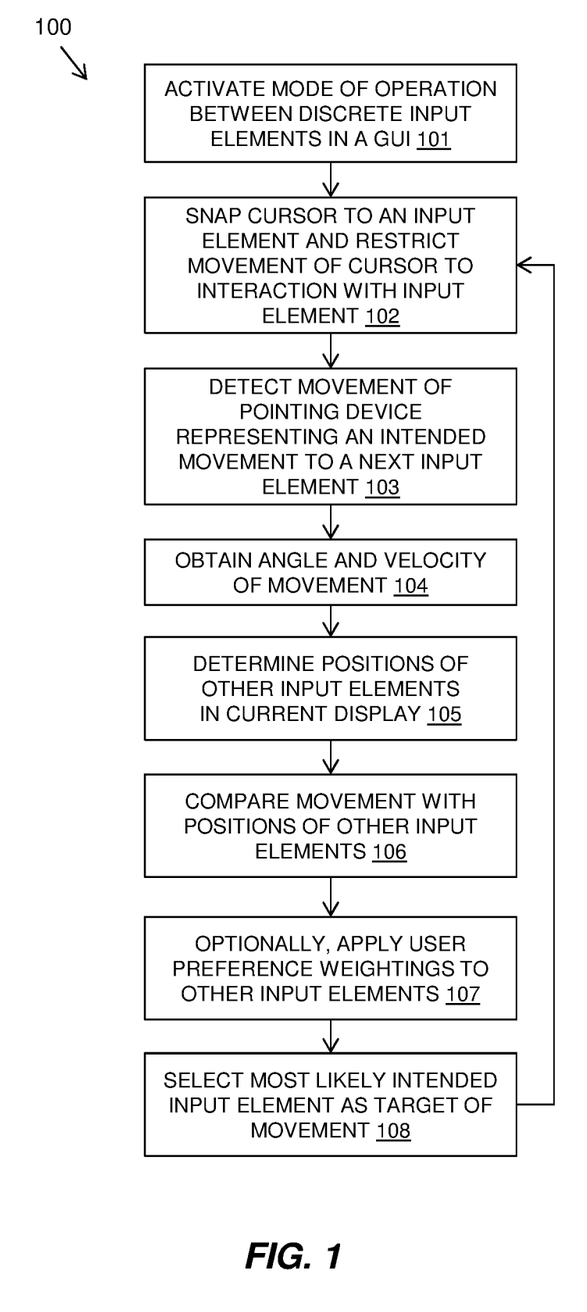
FIG. 1 is a flow diagram of an example embodiment of a first aspect of a method in accordance with the present disclosure.

Referring to FIG. 1, FIG. 1 is a a flow diagram 100 illustrating an example embodiment of an aspect of the described method for user interaction with a GUI using a pointing device to control a cursor on the GUI.

The method may activate 101 a mode of operation that provides movement of the input focus of a pointing device between discrete input elements in the GUI. This may be activated by manual activation using a command input by the user, or may be by automatic activation configured to be activated when a user interacts with a particular web page or type of web page or application. Learnt automatic activation may also be applied and may be learnt by monitoring user's past behavior. Further details of this aspect are given in relation to FIG. 2 below.

When the mode of operation is activated, the method may snap 102 the cursor to a first input element in the GUI. This may be the closest input element to the last position of the cursor when the mode of operation was activated.

The term "snap" is used to describe the action of moving the cursor's point of interaction on the display to the input element and restricting the movement of the cursor to interaction with the input element. The cursor may be hidden from view during the snapping movement or may be shown to the user. Inputs at the input element are received via user interaction with the pointing device. The snap of the cursor to the input element may hide the cursor from view in the GUI display and may highlight the input element to show that operation of the pointing device is focused on the input element.

The user may interact with the input element and may wish to snap to another input element, or the user may wish to snap to another input element straightaway without interacting with the first input element.

The method may detect 103 a movement of the pointing device representing an intended movement from the first input element towards another target input element in the current display of the GUI. In one embodiment, the movement may be detected with a velocity above a defined threshold in order to indicate that it represents an intended movement to a next input element. The detected movement may be distinguished from a movement of the pointing device during interaction with the current input element.

The method may obtain 104 an angle and, optionally, a velocity of the detected movement and may determine 105 positions of other input elements in a current user display of the GUI with respect to the position of the current input element. The positions of the other elements may be their angles with respect to the current position of the cursor at an input element and, optionally, the distances to the other elements from the current position of the cursor at an input element. The method may compare 106 the angle of the movement with each of the angles of the other input elements in relation to the position of the current input element to identify a smallest difference in angle that may indicate an intended target input element.

The comparing step may, in addition to comparing the angle of the movement with the angle of the other input elements, use the velocity of the movement to determine a distance to the target input element. A higher velocity movement may be interpreted to indicate a more distant target input element. A function based on the velocity of the movement may be applied to the angle and/or distance comparison to compensate for a lack of accuracy of the angle at higher velocities of movement.

The method may optionally apply 107 user preferences as weightings for the other input elements based on past use of the GUI and its input element by the user.

The method may select 108 a most likely intended input element as the target of the movement and may snap 102 the cursor to the selected input element. This iterates the method to provide interaction with the selected input element and further detected movement may identify a next target input element.

Figure 2:
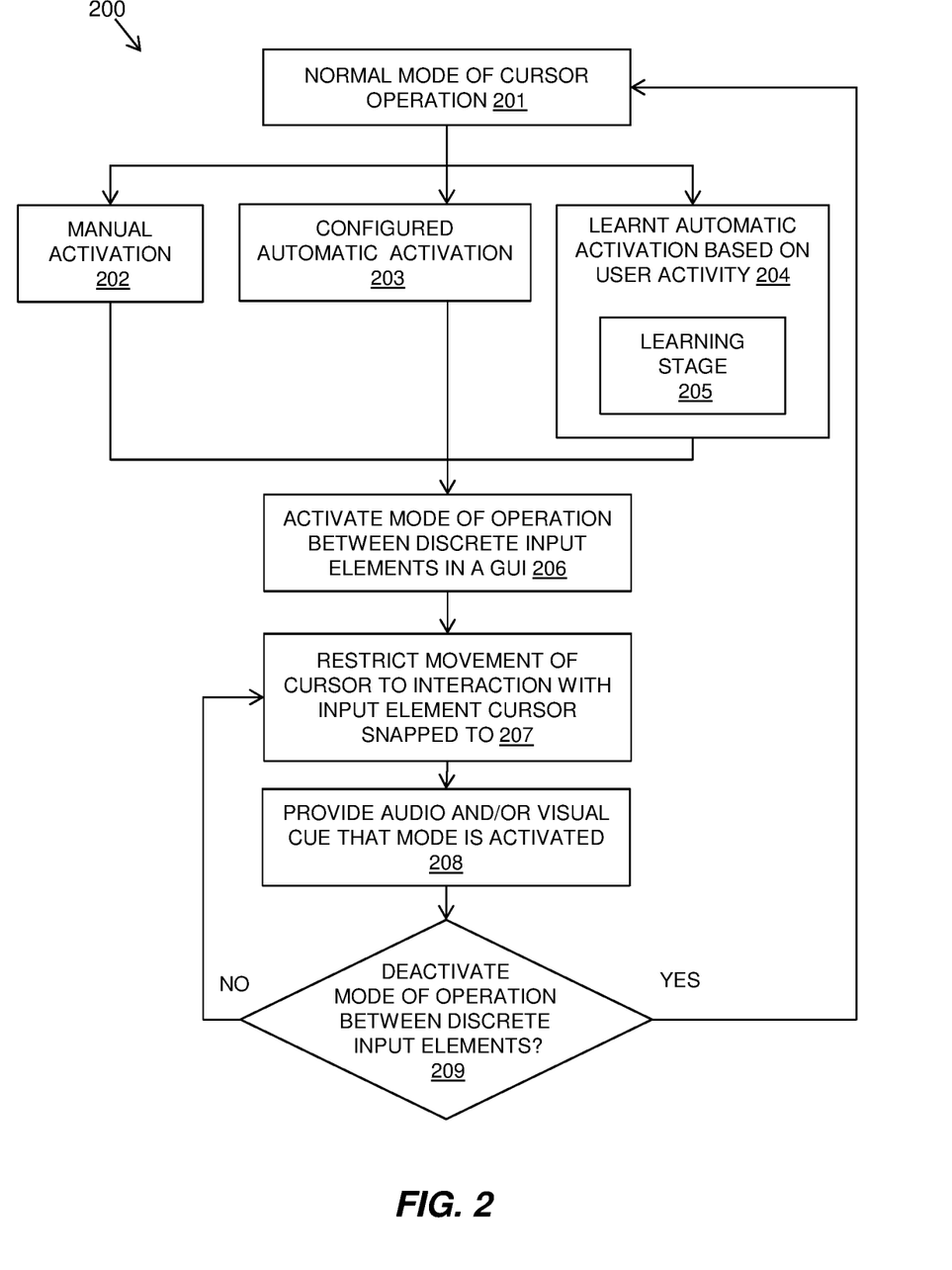
FIG. 2 is a flow diagram of an example embodiment of a second aspect of a method in accordance with the present disclosure.

Referring to FIG. 2, FIG. 2 is a a flow diagram 200 illustrating an example embodiment of an aspect of the described method for user interaction with a GUI using a pointing device to control a cursor on the GUI.

The method may be carried out during normal operation 201 of a cursor navigation about a GUI display by means of user operation of a pointing device. In such operation, the cursor is represented on the GUI display and moved around the display in correspondence with the movement of the pointing device.

The described discrete navigation mode between input elements in the GUI display may be activated when required. This may be by manual activation 202 by the user or by automatic activation based on user activity 204 or user configuration 203. The mode may be activated 206 to provide discrete navigation between input elements.

Manual activation 202 may be activated using either a keyboard shortcut or a user configuring activation preferences.

Configured automatic activation 203 may be activated when a user performs an action that is configured to activate the described discrete navigation mode. The configured actions may be to open a specified web page or application (for example, an online banking web page or application in which interaction with a series of input elements is required).

Learnt automatic activation 204 may be activated when a user performs a task, uses an application or web page, or otherwise carries out a given scenario that has been learnt from user's past behavior as using the described discrete navigation mode. A learning stage may be provided during which the method may learn what tasks/applications/scenarios the user tends to be performing when using the described mode.

Once the method has sufficient learnt data from the learning stage, it will begin to automatically activate when it detects the user in a suitable scenario. The user may still be able to manually override the mode's activation and disable the automatic activation.

The learning stage 205 may use a variety of metrics to in order to determine when the mode should be activated. The user may have the option to set some preferences if they would like, for example, always being off when on a checkout screen when online shopping, because they would not be initially comfortable with using it to make a purchase.

The user may toggle the mode on and off with a keyboard shortcut during the learning stage 205 in order to express their preferences. The system learns as the user toggles it on and off, learning the types of scenarios the user wants to use it for and which ones they do not.

For example, the user may want the described mode to be active in the following example scenarios:

When navigating areas with large amounts of white space, such as web pages;

When navigating small clickable areas, such as a menu; and

When navigating within different applications, such as text editors.

The user may not want the described mode to be active when they are resizing window.

When activated, the discrete navigation mode restricts movement of the cursor to interaction with a current input element that the cursor is snapped to. When activated, the method may provide 208 an audio and/or visual cue to the user to ensure they are aware that the mode has been activated.

It may be determined if the mode is deactivated 209. This may be a manual deactivation, configured automatic deactivation, or learnt deactivation that correspond to the different types of activation. However, manual deactivation may override an automatic activation of the mode providing the user with ultimate control.

If the mode is deactivated 209 the navigation may revert to the normal operation of the cursor by the pointing device. If the mode is not deactivated, the movement of the cursor will continue to be restricted 207 to interaction with the current input element.

As an example scenario, when the user moves the cursor over a browser window, the method identifies that it is going into a web page thus activates the mode and removes the cursor and highlights the nearest clickable area, changing the computer's focus. The user then navigates over the clickable elements in the browser using the mouse or trackpad. When they reach the element they want to interact with, they may make an input using the pointing device, as they would if they were navigating using a cursor.

This method combines the classic way of directional navigation using a pointing device such as a mouse or a trackpad, and the feature focus of keyboard navigation into a more efficient and accessible navigation solution while still being natural and eliminating a learning curve. For user's who are using this feature to improve efficiency, rather than for accessibility, the system may automatically swap between the described mode of navigation and traditional mouse and cursor navigation.

Using the user's past behavior improves the likelihood of moving the focus to the intended area, particularly when there is a high density of input elements on a page.

Figure 3:
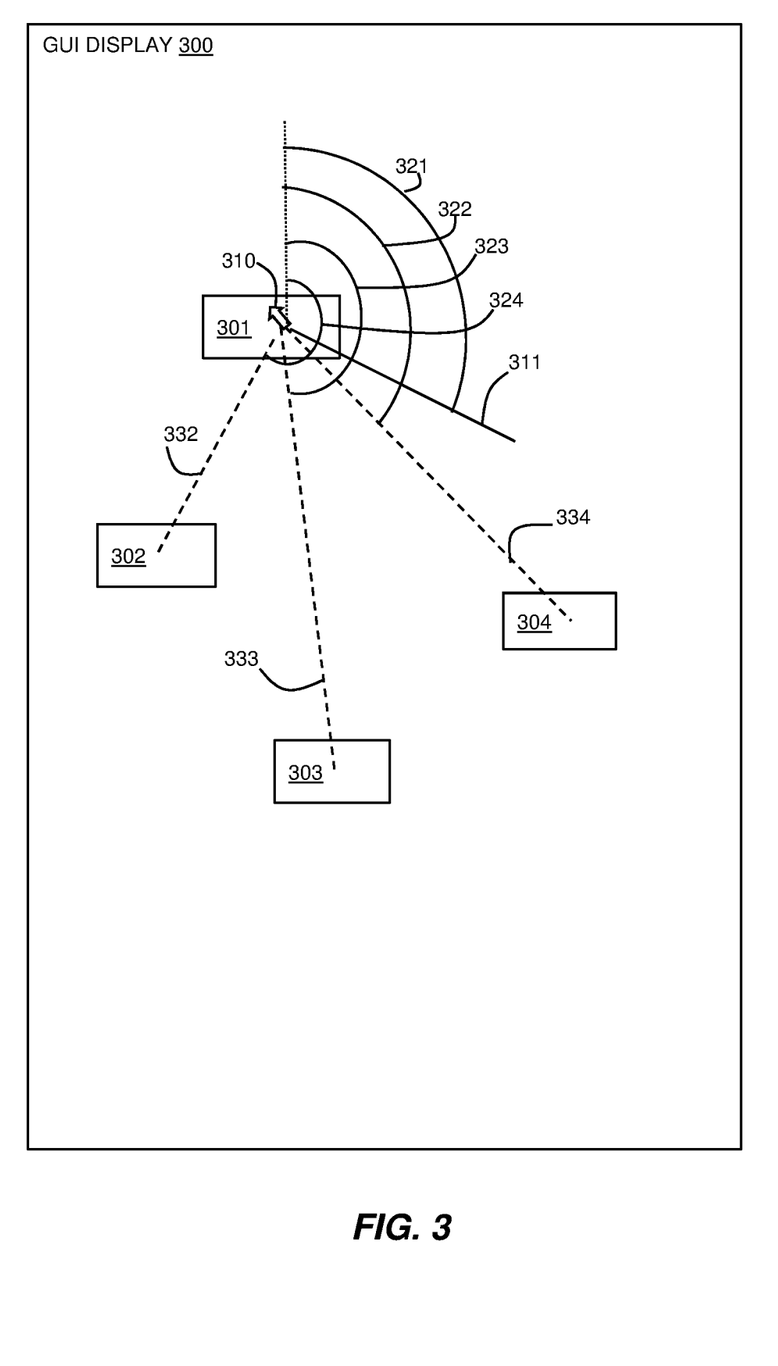
FIG. 3 is a schematic diagram illustrating a graphical user interface in which the present disclosure may be implemented.

An example embodiment of the selection of the most likely intended target input element is described further below with reference to FIG. 3. FIG. 3 illustrates a schematic representation of a GUI display 300 with a current input element 301 at which a cursor 310 is snapped in the described discrete navigation mode. Potential target input elements 302, 303, 304 are provided in the GUI display 300. A movement of the pointing device from the current position of the cursor 310 is shown as line 311.

The following definitions are used:
  $a_c$—Angle between cursor 301 and a given input element 302-304 (angles 322-324);
  $d_c$—Distance between the cursor 310 and a given input element 302-304 (distances of lines 332-334);
  $a_m$—Angle user moves the pointing device in 321;
  $v_m$—Velocity the user moves the pointing device with;

$w_c$—The probability of a user wanting to interact with a given input element 302-304;

j—Some function of $$V_m, j = f\left(\alpha, \frac{1}{v_m}\right),$$

where α is a positive constant defined by the implementor; and k—Some function of $$V_m, k = f\left(\beta, \frac{1}{v_m}\right),$$

where β is a positive constant defined by the implementor.

The distance between the current input element 301 (which is the current position of the cursor 301) and potential target input elements 302-304 may be obtained. Each pixel on the screen has a coordinate and the central pixel of each element may be used as the element's coordinate. The coordinates of the current input element 301 are the coordinates of the element currently in focus. Finding the distance between two coordinates is a very well-known mathematical method.

The velocity of the pointing device (i.e., the speed in a specific direction) may be determined by looking at the movement on the pointing device.

For a pointing device in the form of a mouse, a user moves the mouse causing a detector on the bottom to detect movement. The mouse may start with no movement registered. A movement of the mouse may then be made and a time duration of a movement may be recorded. The coordinates between a start and end location of the mouse can be obtained and the distance moved by the mouse may be found using the start and end locations of the mouse for a "single swipe".

For a trackpad the process is similar to a mouse, but the start location is where the user touches the trackpad, and the end location is the location on the trackpad they are touching before they take their finger off the trackpad. This information is readily available from the output of any mouse or trackpad.

A speed of movement can be calculated using speed=distance/time and the direction between the two points can also be found using the coordinates of the two points to give the velocity.

In a first embodiment, the angle of the movement of the pointing device (represented by the movement of the cursor 310 along line 311 in FIG. 3) is used in comparison to the angles of the potential target input elements 302-304 in the GUI display 300.

The angles 322-324 between the current position of the cursor 310 at the current input element 301 and the center of the potential target input elements is $a_c$, shown in FIG. 3.

The angle the user moves the pointing device in is calculated, $a_m$, by using the data of the pointing device as gathered by the operating system.

There may be a threshold velocity $v_t$ of the pointing device required to be recognized as an indicative movement to a next input element.

The cursor 310 is moved to the potential target input element with the minimum value for:

$$j||a_c|-|a_m|| \qquad \text{Equation 1}$$

j may be provided as a function of the velocity of the swipe, $$j = f\left(\alpha, \frac{1}{v_m}\right),$$

so that the angle component has less impact at higher velocities. A user may be less accurate on the angle of movement of the pointing device when they are inputting a faster movement.

In a second embodiment, the distances 332-334 between the cursor 310 and the potential target input elements are also considered.

The angle and distance between the cursor and the center of the potential target input elements 302-304 is found, $a_c$ and $d_c$.

The angle and velocity the user moves the pointing device in is calculated, $a_m$ and $v_m$.

In this embodiment, the velocity and distance are used to provide an indication of whether the user wishes to move to a nearby input element or an input element that is further away. If the user swipes quickly, i.e. with a high velocity, then the method infers that the user wants to move to a further away input element.

The cursor 310 moves to the potential target input element 302-304 with the minimum value for:

$$j||a_c|-|a_m||\cdot kd_c \qquad \text{Equation 2}$$

Where j, k are some function of $$V_m, j = f\left(\alpha, \frac{1}{v_m}\right),$$

where α is a positive constant defined by the implementor, and $$k = f\left(\beta, \frac{1}{v_m}\right),$$

where β is a positive constant defined by the implementor. k enables the distance to be considered in relation to the velocity of the swipe, with a higher velocity giving preference to input elements at further distances.

The optimum values of j and k can be found experimentally. Factors that may contribute to this may include users, applications, pointing devices, and screens.

In a third embodiment, the same parameters as the previous two embodiments are used, and additionally weightings are provided that takes into account the fact that different potential target input elements are more likely to be interacted with.

The probability of a given user wanting to interact with a given potential target input element is found, $w_c$. This may be based on data from other users' interactions with the page and the present user's previous behavior on the page. This is similar to how search sites calculate the likelihood of a user wanting to go to a given page based on a search string. The angle and velocity the user moves the pointing device in is calculated, $a_m$ and $v_m$.

When a user uses a page, the number of times they click certain buttons is tracked, as well as the order in which they press each button, and where they moved the mouse from before clicking them. A number of tools may be used to generate a probability based on this behavior of a user wanting to click any given button, based on where the mouse currently is and the buttons they have clicked recently.

There are a number of a machine learning methods that would be suitable to learn this behavior. A simplistic model would also be possible of a number of times a user has clicked a button divided by a total number of clicks they have recorded on the page.

By having a weighting for different input elements, the method increases the likelihood of the user navigating to the input element they want. This would be particularly helpful on pages with a lot of input elements, such as a web page. The method allows a user to navigate past unwanted input elements quickly.

The cursor moves to the input area with the minimum value for:

$$j||a_c|-|a_m||\cdot kd_c\cdot w_c \quad \text{Equation 3}$$

The optimum values for j and k may be different to the previous case.

This solution may be implemented in a number of ways including, for example, as an operating system level feature or a browser plug-in.

Figure 4:
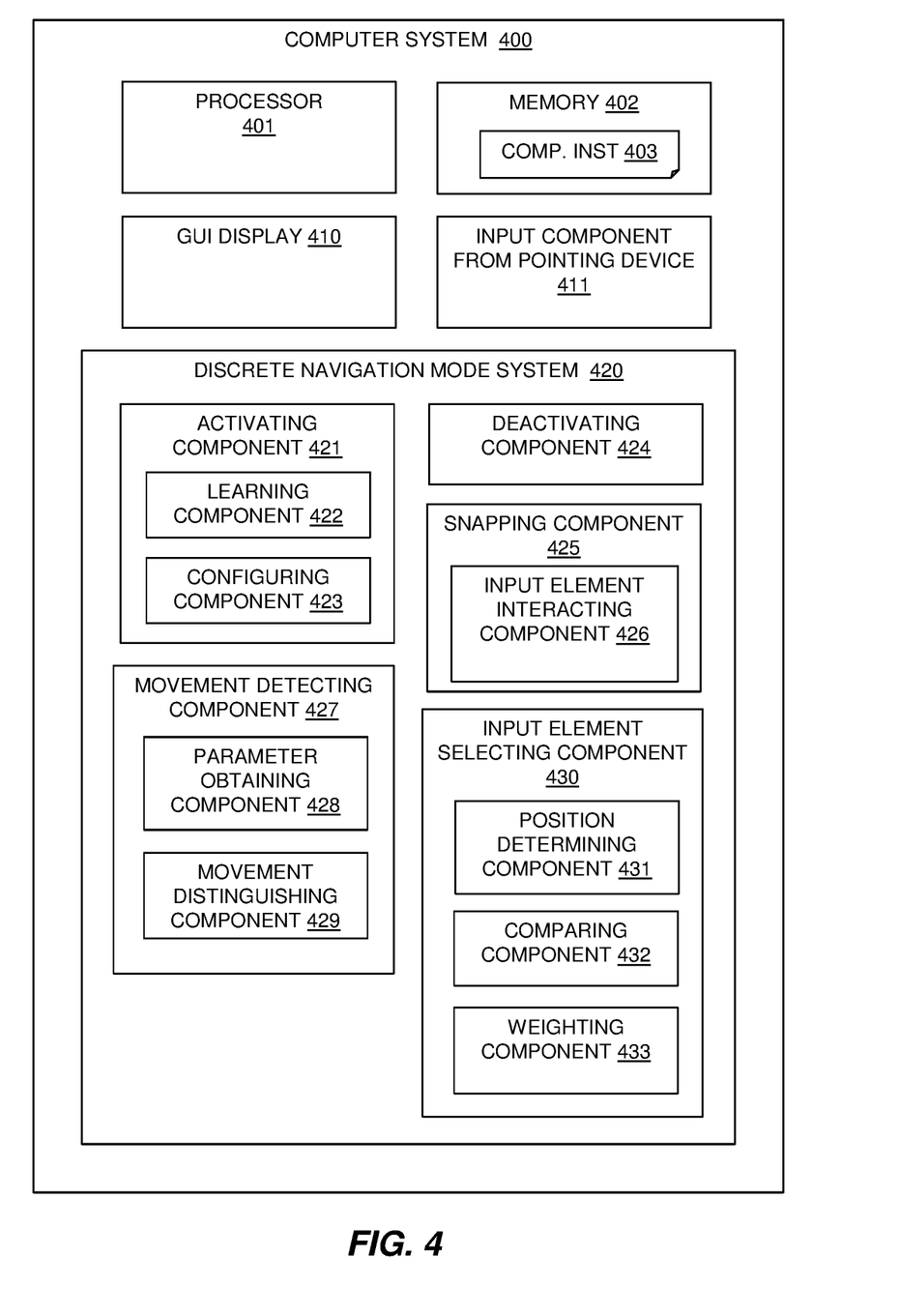
FIG. 4 is block diagram of an example embodiment of a system in accordance with the present disclosure.

Referring to FIG. 4, FIG. 4 is a block diagram illustrating a computer system 400 with an example embodiment of an implementation of the described discrete navigation mode system 420.

The computer system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components. The computer system 400 may include a GUI display 410 and an input component 411 for receiving inputs from a pointing device.

The discrete navigation mode system 420 includes an activating component 421 and a deactivating component 424 for moving between the described mode of operation between discrete input elements in the GUI and a usual continuous navigation mode of a pointing device. The activating component 421 and deactivating component 424 may be controlled by receiving manual activation input by a user.

The activating component 421 may also or alternatively be activate the described discrete navigation mode by automatic activation and may include a learning component 422 for learning user preferences for use of the mode of operation by past activation of the mode of operation and/or a configuring component 423 for configuring user preferences.

The discrete navigation mode system 420 may include a snapping component 425 for snapping the cursor to an input element when in the discrete navigation mode. The snapping component 425 may include an input element interacting component 426 for restricting the movement of the cursor to an input element once snapped to that input element. The snapping component 425 may hide the cursor from view in the GUI display and/or may highlight the input element.

The snapping component 425 may snap to a first input element after activation of the mode of operation by snapping to a nearest input element in a current display of the GUI.

The discrete navigation mode system 420 may include a movement detecting component 427 for detecting a movement of the pointing device whilst snapped to an input element representing an intended movement from an input element to another input element. The movement detecting component 427 may include a parameter obtaining component 428 for obtaining an angle and a velocity of the movement.

The detected movement component 427 may include a movement distinguishing component 429 for distinguishing a detected movement of the pointing device representing an intended movement to a next input control from input to a current input element. The movement distinguishing component 429 may detect a movement with a velocity above a defined threshold.

The discrete navigation mode system 420 may include an input element selecting component 430 for selecting a most likely intended input element as the target of the movement. The input element selecting component 430 may include a position determining component 431 for determining positions of the other input elements and a comparing component 432 for comparing the angle and velocity of the movement with the positions of the other input elements. The comparing component 432 may compare an angle of the movement with the angle of the other input elements and uses the velocity of the movement to determine a distance to the target input elements.

The input element selecting component 430 may include a weighting component 433 for applying a weighting for input elements based on user preferences for control inputs based on past use of the GUI.

Figure 5:
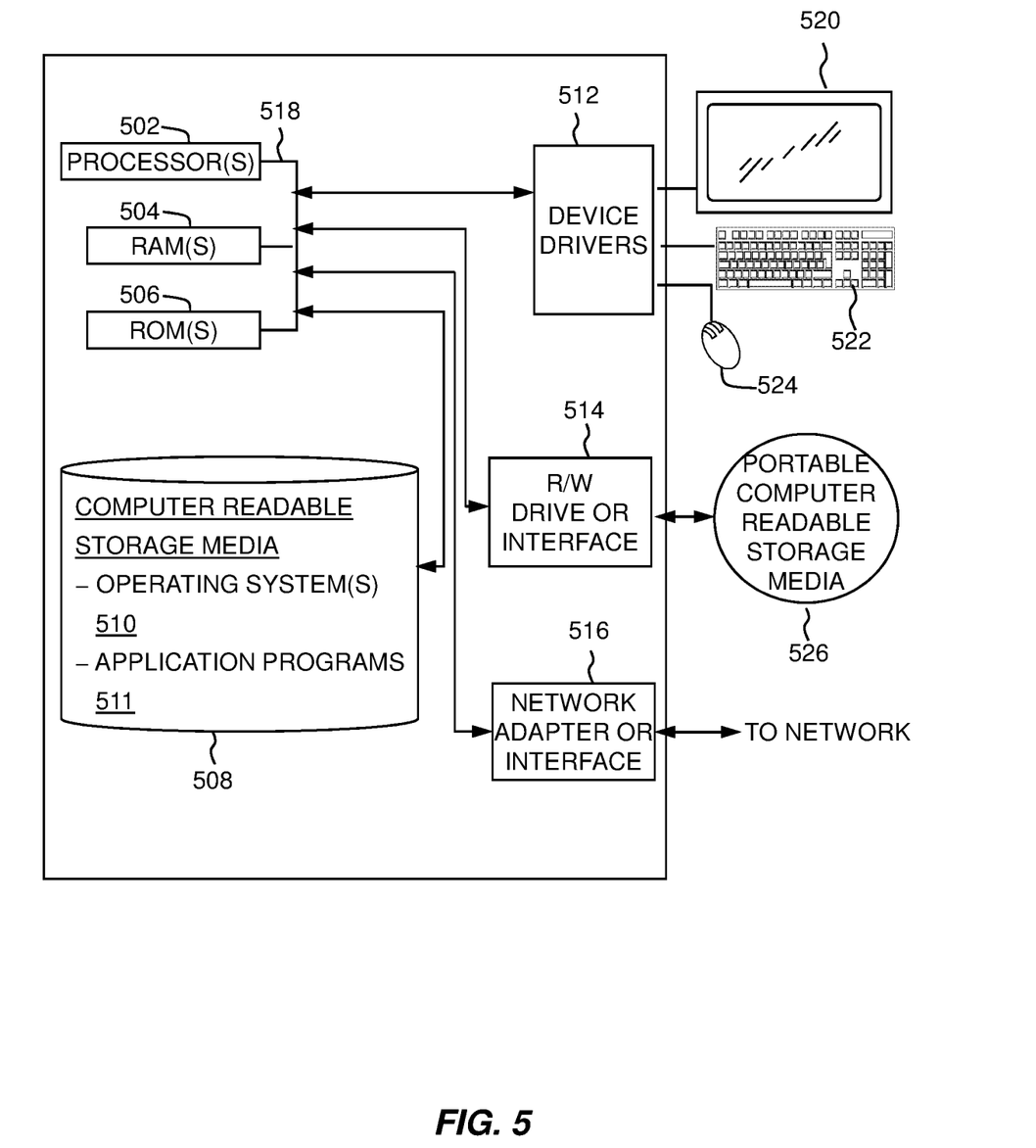
FIG. 5 is a block diagram of an embodiment of a computer system in which the present disclosure may be implemented.

FIG. 5 depicts a block diagram of components of the computer system 400 of FIG. 4, in accordance with an embodiment of the present disclosure. It should be appreciated that FIG. 5 provides only an illustration of one implementation and does not imply any limitations with regard to the environments in which different embodiments may be implemented. Many modifications to the depicted environment may be made.

Computer system 400 can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the discrete navigation mode system 420 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

Computer system 400 can also include a R/W drive or interface 514 to read from and write to one or more portable computer readable storage media 526. Application programs 511 on computer system 400 can be stored on one or more of the portable computer readable storage media 526, read via the respective R/W drive or interface 514 and loaded into the respective computer readable storage media 508.

Computer system 400 can also include a network adapter or interface 516, such as a TCP/IP adapter card or wireless communication adapter. Application programs 511 on computer system 400 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computer system 400 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for navigation between input elements of a graphical user interface (GUI) using a pointing device to control an interaction with the GUI, comprising:
    activating a mode of operation between discrete input elements in the GUI;
    snapping the cursor to a first input element, wherein the movement of the cursor is then restricted to the first input element and input to the input element is receivable via user interaction with the pointing device;
    detecting a movement of the pointing device representing an intended movement from the first input element to another input element, including obtaining an angle of the movement;
    determining a velocity of the detected movement;
    selecting a most likely intended input element as the target of the movement by evaluating positions of other input elements in a current user display of the GUI and comparing the angle of the movement with the positions of the other input elements wherein comparing the angle of movement includes applying a function of the velocity to give less weight to angles of movements with higher velocity;
    snapping the cursor to a selected input element, wherein the movement of the cursor is then restricted to the selected input element and input to the selected input element is receivable via user interaction with the pointing device; and
    iterating the method to detect a further movement of the pointing device from the selected input element to select a next input element until the mode of operation is deactivated.

2. The method of claim 1, wherein evaluating positions of other input elements includes the distance from the first input element to each of the other input element; and
    wherein selecting a most likely intended input element compares an angle and velocity of the movement with the angle and distance of the other input elements and uses the velocity of the movement to determine a distance to the target input elements.

3. The method of claim 1, wherein selecting a most likely intended input element includes a weighting for input elements based on user preferences for control inputs based on past use of the GUI.

4. The method of claim 1, wherein detecting a movement of the pointing device representing an intended movement from the first or the selected input element detects a movement with a velocity above a defined threshold.

5. The method of claim 1, wherein snapping the cursor to a first input element after activation of the mode of operation includes snapping to a nearest input element in a current display of the GUI.

6. The method of claim 1, wherein snapping the cursor to a first input element or a selected input element includes hiding the cursor from view in the GUI display and/or highlighting the selected input element.

7. The method of claim 1, wherein activating and deactivating the mode of operation between discrete input elements in the GUI is by receiving manual activation input by a user.

8. The method of claim 1, wherein activating a mode of operation between discrete input elements in the GUI is by automatic activation including learning a user preferences for use of the mode of operation by past activation of the mode of operation or by configuring user preferences.

9. The method of claim 1, wherein when the cursor is snapped to a first or a selected input element and the movement of the cursor is restricted to the first or the selected input element, interaction of the pointing device with the input element is receivable via user interaction with the pointing device and distinguished from a detected movement of the pointing device representing an intended movement to a next input control.

10. A system for navigation between input elements of a graphical user interface (GUI) using a pointing device to control an interaction with the GUI, comprising:
    a processor and a memory configured to provide computer program instructions to the processor to execute the function of the components:
    an activating component for activating a mode of operation between discrete input elements in the GUI;
    a snapping component for snapping the cursor to an input element, wherein the movement of the cursor is then restricted to the first input element and input to the input element is receivable via user interaction with the pointing device;
    a movement detecting component for detecting a movement of the pointing device representing an intended movement from an input element to another input element, including a parameter obtaining component for obtaining an angle of the movement; and an input element selecting component for selecting a most likely intended input element as the target of the movement by evaluating positions of other input elements in a current user display of the GUI and comparing the angle of the movement with the positions of the other input elements wherein comparing the angle of movement includes applying a function of a velocity to give less weight to angles of movements with higher velocity.

11. The system of claim 10, wherein the parameter obtaining component obtains a velocity of the movement.

12. The system of claim 10, wherein the input element selecting component compares an angle of the movement with the angle of the other input elements and uses the velocity of the movement to determine a distance to the target input elements.

13. The system of claim 10, wherein the input element selecting component includes a weighting component for applying a weighting for input elements based on user preferences for control inputs based on past use of the GUI.

14. The system of claim 10, wherein the snapping component includes snapping the cursor to a first input element after activation of the mode of operation by snapping to a nearest input element in a current display of the GUI and hides the cursor from view in the GUI display and/or highlights the input element.

15. The system of claim 10, including a deactivating component for deactivating the mode of operation between discrete input elements in the GUI and returning to a continuous mode of navigation of the GUI.

16. The system of claim 10, wherein the activating component for activating the mode of operation is controlled by receiving manual activation input by a user.

17. The system of claim 10, wherein the activating component for activating the mode of operation is by automatic activation and includes a learning component including learning user preferences for use of the mode of operation by past activation of the mode of operation and/or a configuring component for configuring user preferences.

18. The system of claim 10, wherein the movement detecting component includes a movement distinguishing component for distinguishing a detected movement of the pointing device representing an intended movement to a next input control from input to a current input element.

19. A computer program product for navigation between input elements of a graphical user interface (GUI) using a pointing device to control an interaction with the GUI, the computer program product comprising a computer readable storage medium having program instructions embodied therewith, the program instructions executable by a processor to cause the processor to:

activate a mode of operation between discrete input elements in the GUI;

snap the cursor to a first input element, wherein the movement of the cursor is then restricted to the first input element and input to the input element is receivable via user interaction with the pointing device;

detect a movement of the pointing device representing an intended movement from the first input element to another input element, including obtaining an angle of the movement;

determine a velocity of the detected movement;

select a most likely intended input element as the target of the movement by evaluating positions of other input elements in a current user display of the GUI and comparing the angle and of the movement with the positions of the other input elements, wherein evaluating positions of other input elements includes the distance from the first input element to each of the other input element, wherein selecting a most likely intended input element compares an angle and velocity of movement with the angle and distance of the other input elements and uses the velocity of the movement to determine a distance to the target input elements;

snap the cursor to a selected input element, wherein the movement of the cursor is then restricted to the selected input element and input to the selected input element is receivable via user interaction with the pointing device; and iterate the method to detect a further movement of the pointing device from the selected input element to select a next input element until the mode of operation is deactivated.

\* \* \* \* \*